G. F. CONRAD.
CLAMPING MEANS FOR FEEDING DEVICES.
APPLICATION FILED JULY 7, 1913.
1,099,894.
Patented June 9, 1914.
2 SHEETS—SHEET 1.
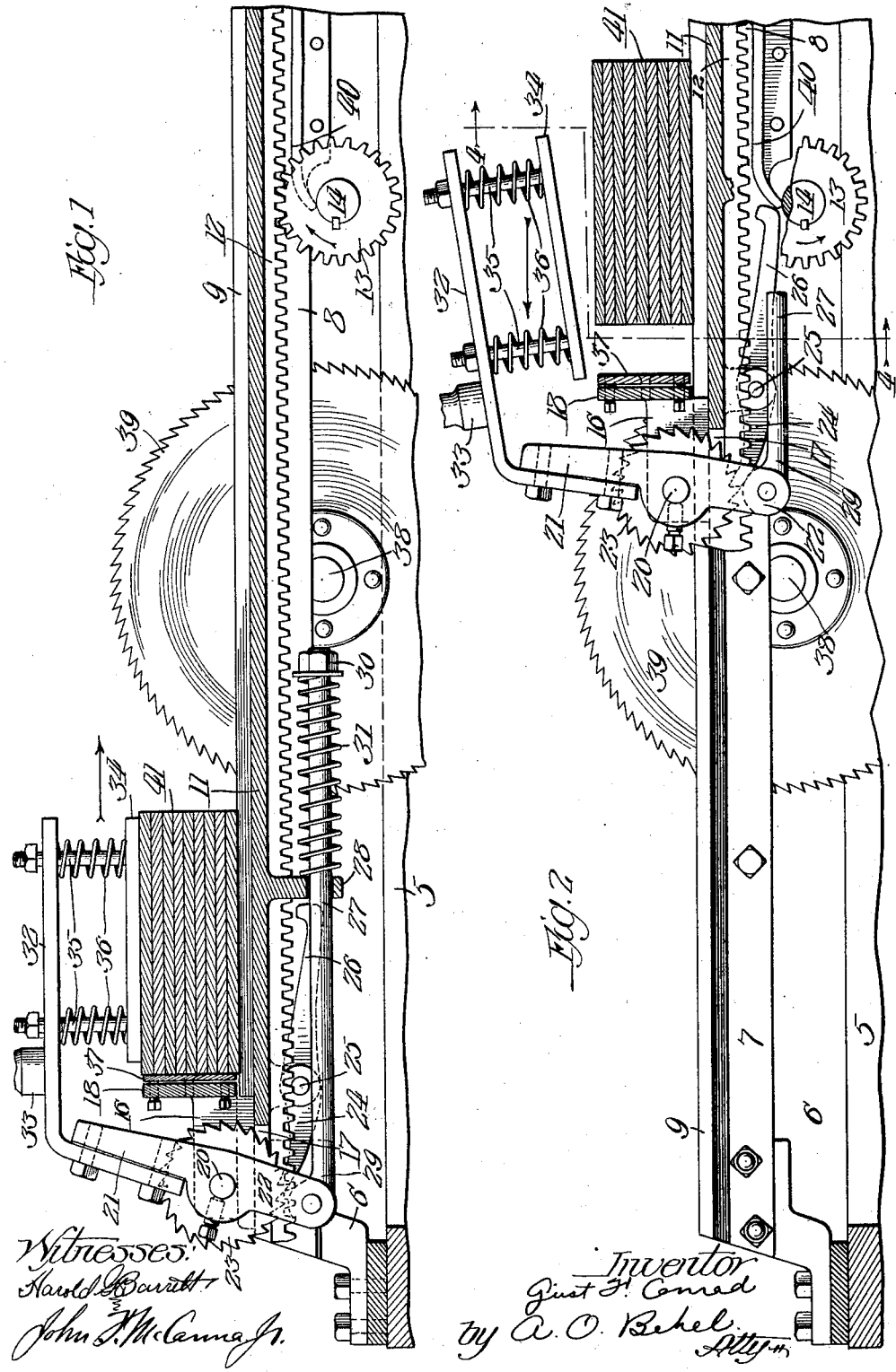
Witnesses:
Harold Barrett
John F. McCanna Jr.
Inventor
Gust F. Conrad
by A. O. Behel
Atty.

G. F. CONRAD.
CLAMPING MEANS FOR FEEDING DEVICES.
APPLICATION FILED JULY 7, 1913.
1,099,894.
Patented June 9, 1914.
2 SHEETS—SHEET 2.
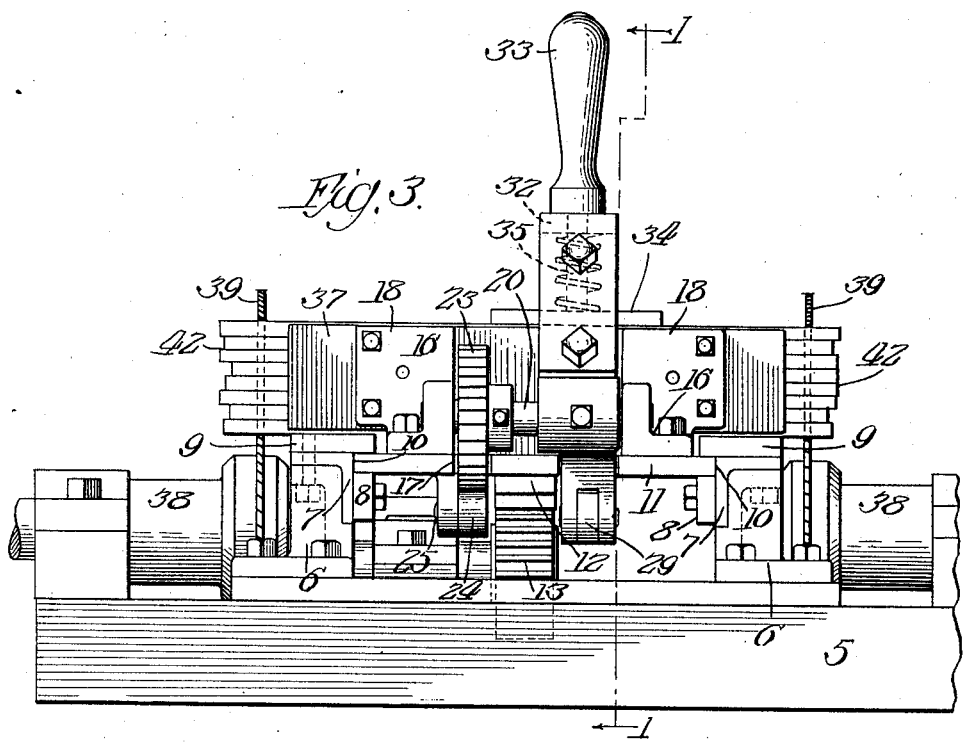
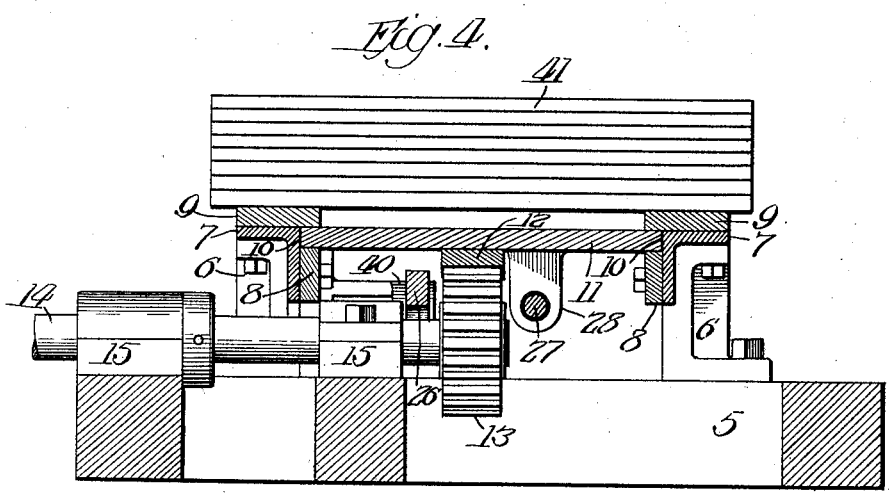

UNITED STATES PATENT OFFICE.

GUST F. CONRAD, OF ROCKFORD, ILLINOIS, ASSIGNOR OF ONE-HALF TO OVID D. WAY, OF ROCKFORD, ILLINOIS.

CLAMPING MEANS FOR FEEDING DEVICES.

1,099,894.  Specification of Letters Patent.  Patented June 9, 1914.

Application filed July 7, 1913. Serial No. 777,667.

*To all whom it may concern:*

Be it known that I, GUST F. CONRAD, a citizen of the United States, residing at Rockford, in the county of Winnebago and State of Illinois, have invented certain new and useful Improvements in Clamping Means for Feeding Devices, of which the following is a specification.

This invention relates to feeding devices and more particularly to a clamping means coöperating with the feeding device to carry work to be fed fixed with the feeding device.

The object of my invention is to provide a novel clamping means for coöperating with a feed table adapted to carry work to cutting saws, the clamping means to engage and hold work to be fed in a fixed and positive relation with the feeding table whereby the table may be fed to the saws with the work positively carried; and of means for automatically releasing the clamping means to release the work from the feed table at the finish of the feeding operation.

In the accompanying drawings: Figure 1, is a longitudinal sectional view through a saw table showing the clamping means and feed table in an operative position, and as taken on the line 1—1 of Fig. 3. Fig. 2, is a view similar to Fig. 1, but with the feed table having been moved to the end of its stroke and commenced on its return stroke Fig. 3, is an end view looking at the clamping means end of Fig. 1. Fig. 4, is a transverse sectional view taken on the line 4—4 of Fig. 2.

The sawing device as here disclosed is such as is adapted to trim the opposite ends of material fed through the saws and my improved clamping means is adapted to clamp a plurality of boards or strips in a stack while they are being fed through the machine; a suitable application of these means being to a sawing device adapted to trim the opposite ends of a stack of veneer, in such use it is herein illustrated.

A bed frame 5 supports end track supports 6 which carry spaced apart longitudinally, two angle beam track carriers 7 with their angle corners faced inward. Guide rails 8 are bolted to the beams 7 at the inner sides of the beams below the upper edges thereof, and carrying tracks 9 are secured to the top faces of beams 7, overlapping the inner longitudinal edges thereof, thereby forming guide-ways 10.

A feed table 11 is interposed between the beams 7 and mounted with its longitudinal edges in the guideways 10, and fixedly carries depending from its under face, a rack 12 with which a spur drive pinion 13, which is secured to shaft 14, journaled in bearings 15, engages to reciprocate the table 11; the shaft 14 being adapted to be driven by suitable means a predetermined number of revolutions in one direction and then reversed in its rotation whereby the table 11 will be moved in one direction as a feed stroke and returned to its original position as an inoperative return stroke. Two brackets 16 are bolted to the top side of table 11 at each side of the opening 17, in an end of said table, and said brackets are formed with back supports 18 and bearings 19 in which is journaled a shaft 20 transverse to the feed direction of the table and spanning said opening 17. A rocker arm having upper and lower arm members 21 and 22 respectively is mounted fixed upon shaft 20. A ratchet wheel 23 is mounted fixed on shaft 20, and a dog 24 pivotally mounted on a pin 25 carried by and at the under side of table 11 engages the teeth of said ratchet wheel, being held in such engagement by its end 26 being heavier than its end 24, thus overbalancing same. A rod 27 is loosely supported in an apertured stud 28 depending from the under side of table 11, has one end 29 in a pivotal connection with the lower arm 22 of the rocker arm, a nut 30 fixed at its opposite end, and a coiled spring 31 interposed between the lug 28 and nut 30 whereby a tension is imparted to the rod 27 tending to move the arm 21 of the rocker arm in a direction opposite to the feed direction of the table and against the said rocker engagement. A clamp supporting arm 32 is bolted to arm 21 of the rocker arm, extends longitudinally over the feed table, has a handle 33 carried at its upper side and a clamping plate 34 spaced parallel with its free end to the under side thereof, the said plate being secured to the arm 32 by bolts 35 which are loose in the arm 32 and have coiled springs 36 upon the bolts 35, between the arm 32 and plate 34, making the said plate 34 yieldable in its connection with arm 32. A table back 37 is bolted to the back supports 18 and is carried above the tracks 9. Saw arbors 38 are oppositely mounted at the sides of the track supports, are adapted to be suitably driven, and have circular saws 39 fixed to their ends adjacent the tracks. A cam-face plate 40 is secured to the inner side of a track support 6 at the finish side of the saws and in alinement longitudinally with the free end of the dog lever 26.

The feeding device when in its inoperative position is at the end of the track as shown in Fig. 1, but the clamping device would be in a raised position similar to that shown in Fig. 2. The material 41 to be sawed, the veneer in a stack, is placed upon the tracks 9 against the back 37 with its ends 42 projecting beyond the sides of said track whereby said ends may be trimmed by the saws 39. With the veneer in position the operator presses down upon the handle 33 to engage the clamping plate 34 with the top of the stack, the yielding support of said plate allowing it to yieldingly compress and hold the stack in a positive position; this movement of the rocker arm being against the spring action of spring 31 thus storing up a tensional counter force, and causing the ratchet-wheel to rotate and the dog 17 to hold same locked at the end of its rotation. The stack of veneer is then held positively by the yielding force of spring 36 and the operative positions of the clamping means locked by the ratchet dog against the action of spring 31. With the clamping device in this position and the saws continuously driven, the spur-gear 13 will be caused to rotate and feed the table with the veneer past the saws, thus trimming the ends of the veneer. In this feeding movement it will be seen that the veneer slides upon the stationary rails and is moved through engagement with the back 37 of the feed table and the clamping engagement. When the table reaches the end of its stroke the free end of arm 26 will ride and rise upon the cam face 40, thus disengaging the dog from the ratchet-wheel and allowing the tensional force of spring 31 to actuate the rocker arm and release the clamping arm from the stack of veneer. The drive direction of spur-gear 13 will be then reversed and the feed table returned to its normal position again. In Fig. 2 is shown the table and clamping device as it has just left the veneer on its return stroke, and since the veneer rests upon the fixed tracks 9 it will remain in this position entirely released from the feeding and clamping means.

I claim as my invention—

1. The combination with a reciprocable carriage and a track-way, of means secured to the carriage for engaging material located on said track-way, and of clamping means carried by said carriage, comprising, a clamping member movable into and out of contact with material located upon the track-way, a lockable member for locking automatically the clamping member in a set position upon said clamping means being moved to a set position with the material, and means for releasing said lockable member at a predetermined point in the reciprocation of said carriage.

2. In a clamping device, the combination with a reciprocable carriage, of a clamping member movable into and out of contact with material to be moved by said carriage, clamping means for being automatically set in a locked position when said clamping member has been moved to an operative contact with said material, and means for releasing said locking means at a predetermined point in the reciprocation of the carriage, whereby said clamping member may be movable away from the material.

3. In a clamping device, the combination with a reciprocable carriage, of a clamping member movable into and out of contact with material to be moved by said carriage, a ratchet face having connection with the clamping member and being movable through said movement of the clamping member, a dog adapted to engage the ratchet face, the dog adapted to lock the ratchet face in a set position when said wheel has been actuated by the clamping member being moved to a set position with said material, and means for releasing said dog from the ratchet face at a predetermined point in the reciprocation of the carriage, thereby allowing the clamping member movement away from the material.

4. In a clamping device, the combination with a reciprocable carriage, of a clamping member carried thereby and movable into and out of contact with material to be moved by said carriage, a spring for holding the clamping member in an inoperative position, a ratchet wheel in connection with the clamping member and rotatable through movement of said member, a dog for engaging the ratchet wheel and adapted to hold said wheel from rotation against the action of said spring upon the clamping member when said member is moved to an operative position, the releasing of said dog from the ratchet allowing said spring to actuate the clamping member and move it to its inoperative position.

5. The combination with a track and a carriage reciprocable in the longitudinal direction of the track and adapted to move material located upon the track during its feed reciprocation, of a clamping member carried by the carriage and adapted to yieldingly hold said material in contact with the track during said feed reciprocation, locking means including an operable member movable into locked engagement with a clamping member part for holding said clamping member in said operative position, and means for operating said locking means at a predetermined point in the reciprocation of the carriage to move said operable member out of said engagement.

6. The combination with a reciprocable carriage, of a movable clamping member disposed opposite the carrying face of the carriage and having a clamping face yieldingly movable relatively to the clamping member, an actuable member operated through movement of said clamping member, means for holding said actuable member in its operable position, a spring in connection with the clamping member tending to move said member to an inoperative position, and means for releasing said holding means whereby the said spring will move the clamping member to an inoperative position.

7. The combination with a reciprocable carriage, of a clamping member disposed opposite the carrying face of the carriage and movable toward and away from same, a clamping face carried by the clamping member yieldingly movable toward and away therefrom, a ratchet wheel rotatable through the movement of the clamping member, and an actuable dog to engage the ratchet wheel at intermittent periods during the several movable positions of the clamping member.

8. The combination with a reciprocable carriage, of a rocker shaft carried thereby, a clamping member having connection therewith and movable into and out of contact with material movable by said carriage by movement of the rocker shaft, a ratchet wheel rotatable through movement of the rocker shaft, a spring exerting a tension upon the rocker shaft in one direction to move said clamping member to an inoperative position, a dog adapted to engage the ratchet wheel to hold said rocker shaft in a set position against the action of said spring, and means for releasing the dog from said engagement.

In testimony whereof I have hereunto set my hand in presence of two subscribing witnesses.

GUST F. CONRAD.

Witnesses:
 OVID D. WAY,
 F. R. HOLMES.

Copies of this patent may be obtained for five cents each, by addressing the "Commissioner of Patents, Washington, D. C."